United States Patent Office 3,403,165
Patented Sept. 24, 1968

3,403,165
TETRATHIOTETRACENE ION-RADICAL SALTS
Yoshio Matsunaga, Stamford, Conn., assignor to American Cyanamid Company, Stamford, Conn., a corporation of Maine
No Drawing. Filed Nov. 19, 1963, Ser. No. 324,880
7 Claims. (Cl. 260—327)

This invention relates to new compositions of matter and more particularly to reaction products derived from tetracene donor materials and eletron acceptors such as various benzoquinones. More particularly, the present invention relates to new compositions of matter derived from tetrathiotetracenes as the electron donor and o- and p-benzoquinones having at least two electronegative groups as the electron acceptors, which reaction products or complexes may be designated hereinafter as tetrathiotetracene ion-radical salts.

The tetrathiotetracene ion-radical salts of this invention have, among other utilities, demonstrated that they are new semiconducting compounds of the type useful in solid state semiconductor devices such as transistors, thermistors, rectifiers, diodes, photocells, photoconductors, radiation detectors, thermocouples thermoelectric generators and Peltier cooling cells, among others.

Since there are today but a limited number of known organic semiconductive materials and even fewer such materials which may be characterized as having simple molecular structures which exhibit resistivities of a low order, as for example less than 100 ohm-cm., the discover of organic semiconducting materials constitutes an important scientific advance. It will be appreciated that as the number of organic semiconductors having a resistivity of less than 100 ohm-cm. at room temperature increases, this greatly increases the application areas where an organic semiconductor might be utilized.

Accordingly, it is an object of this invention to provide novel compositions of matter or complexes herein characterized as tetrathiotetracene ion-radical salts.

It is a further object of this invention to provide such salts which may be characterized as having comparatively simple molecular structures and, in selected instances, relatively low resistivities, i.e., less than 100 ohm-cm. at room temperature, and to thus provide materials, particularly those having low resistivities, which are useful as organic semiconductors.

It is a further object of this invention to provide solid state semiconductor devices employing the novel tetrathiotetracene ion-radical salts referred to above and in particular to provide thermoelectric devices employing such semiconductors.

These and other objects and advantages of the present invention will become more apparent from the detailed description thereof set forth hereinbelow.

According to the present invention, new compositions of matter having the formula

[D]$_m$[A]$_n$ are provided in which D is a tetrathiotetracene, a compound having the formula

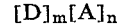

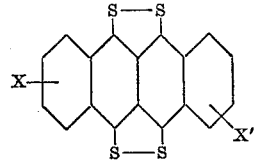

where X and X' may be H or lower alkyl, i.e., containing 1-4 carbon atoms, and m and n are positive integers of 3 and less, and where A is selected from the group consisting of o- and p-benzoquinones having at least 2 electronegative substituents thereon, and tetracyanoethylene, where the electronegative substituents are selected from the group consisting of halogen, cyano, nitro, carboxy and the like.

Typically, the tetrathiotetracenes are tetrathiotetracene per se, 2-methyltetrathiotetracene, 2-isopropyl-tetrathiotetracene, 2,7 - dimethyltetrathiotetracene, and 2,6 - dimethyltetrathiotetracene. Typically, A or the acceptor might be o-chloranil, o-bromoanil, o-iodoanil and the corresponding para compounds, 2-3-dichloro-5,6-dicyano-p-benzoquinone, 2,3 - dibromo-5,6-dicyano-p-benzoquinone, 2,3-dicyano-p-benzoquinone and tetracyanoethylene.

Of the ion-radical salts contemplated above, those demonstrating low resistivities and high thermal stabilities (diffuse reflection spectra show that they are heat stable at temperatures up to 120° C. and even higher) represent particular meritorious aspects of this invention. In particular, these salts have the formula

[D]$_3$[A]$_n$ where D is tetrathiotetracene, and A is o-chloranil, o-bromoanil, o-iodoanil and tetracyanoethylene, in which n is 1, except when A is tetracyanoethylene, in which case n is 2.

The tetrathiotetracene ion-radical salts contemplated by this invention may be prepared by mixing the components dissolved in suitable solvent(s) and recovering the product as a precipitate. Thus, typically tetrathiotetracene is dissolved in a solvent such as trichlorobenzene and a solution of the acceptor material, as for example o-chloranil in appropriate amount in a suitable solvent, are mixed and allowed to stand until a dark red precipitate is formed and recovered by conventional solids separation means.

Suitable solvents include those in which the reactants are mutually soluble and preferably a common solvent is employed, although this need not be the case. Suitable solvents include trichlorobenzene, o-dichlorobenzene and benzene.

The reaction described above may be carried out at ambient or room temperature (20–40° C.) although lower and higher temperatures may be employed.

In addition to their electrical properties predicated upon their semiconductivity, the materials of this invention may be employed as pigments in various systems due to their low solubility and color (red or reddish violet) or as fillers in plastic compositions, particularly where specifically defined electrical properties are required. In addition, such salts are useful as free radical catalysts in the polymerization of polymerizable monomers, as for example styrene, to produce resinous polymers. Further, they may be employed as chemical sensors, since their conductance changes with the absorption of oxygen, or as pressure sensing devices in that their resistivities are known to change with pressure.

In order to illustrate the present invention, the following examples are given primarily by way of illustration. No specific details or enumerations contained therein should be construed as limitations on the present invention except insofar as they appear in the appended claims. All parts and percentages are by weight unless otherwise specifically designated.

Example 1

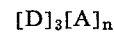
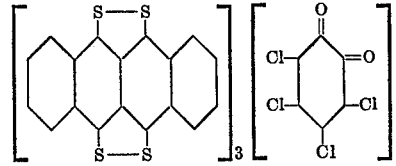

In preparing the above salt, .88 gram of tetrathiotetracene was dissolved in 400 milliliters of hot trichlorobenzene and .9 gram of o-chloranil in 50 milliliters of trichlorobenzene was added.

After standing overnight, the dark red precipitate was filtered, washed with benzene and then washed with ether.

The reaction product was analyzed.

As the salts tend to absorb moisture to some extent, the composition was estimated based upon the chlorine and carbon content. The results of this analysis on three separately prepared samples are as follows:

Theory $(C_{18}H_8S_4)_3 \cdot C_6Cl_4O_2$: C, 55.3%; Cl, 10.9%; D/A, 3.00. Found: Preparation A—C, 53.3%; Cl, 10.2%; D/A, 3.10; Preparation B—C, 52.0; Cl, 10.7%; D/A, 2.85; Preparation C—C, 53.8%; Cl, 10.9%; D/A, 2.91.

Example 2

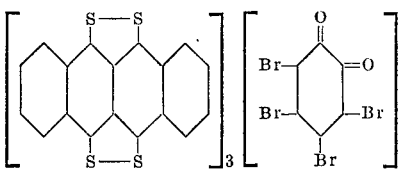

In preparing the above salt, .88 gram of tetrathiotetracene was dissolved in 400 ml. of hot trichlorobenzene and 1.3 gram of o-bromoanil in 50 ml. of trichlorobenzene was added.

After standing overnight, the dark red precipitate was filtered, washed with benzene and then washed with ether.

The reaction product was analyzed.

As the salts tend to absorb moisture to some extent, the composition was estimated based upon the bromine and carbon content. The results of this analysis on two separately prepared samples are as follows:

Theory $(C_{18}H_8S_4)_3 \cdot C_6Br_4O_2$: C, 48.7%; Br, 21.6%; D/A, 3.00. Found Preparation A—C, 49.0%, 47.6%; Br, 21.8%, 21.3; D/A, 3.00, 2.98; Preparation B—C, 49.8%; Br, 21.3%; D/A, 3.14.

Example 3

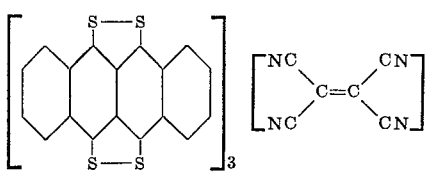

In preparing the above salt, .88 gram of tetrathiotetracene was dissolved in 400 ml. of hot trichlorobenzene and 0.4 gram of tetracyanoethylene in 50 ml. of trichlorobenzene was added.

After standing overnight, the dark red precipitate was filtered, washed with benzene and then washed with ether.

The reaction product was analyzed.

As the salts tend to absorb moisture to some extent, the composition was estimated based upon the nitrogen and carbon content. The results of this analysis on two separately prepared samples are as follows:

Theory $(C_{18}H_8S_4)_3(C_6N_4)_2$: C, 60.4%; N, 8.6%; D/A, 1.50. Found: Preparation A—C, 58.5%; N, 8.2%; D/A, 1.52; Preparation B—C, 59.2%; N, 8.1%; D/A, 1.57.

Example 4

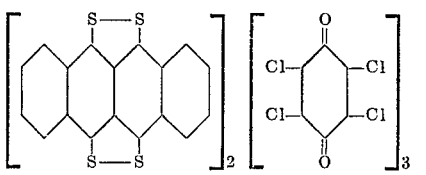

In preparing the above salt, .70 gram (2 mmoles) of tetrathiotetracene was dissolved in 300 ml. of warm trichlorobenzene was mixed with .55 gram of p-chloranil dissolved in 50 ml. of trichlorobenzene.

After standing overnight, the dark red precipitate was filtered, washed with benzene and then washed with ether.

The reaction product was analyzed.

The results of this analysis are as follows:

Theory $(C_{18}H_8S_4)_2 \cdot (C_6Cl_4O_2)_3$: C, 44.9%; H, 1.1%; S, 17.8%; Cl, 29.5%. Found: C, 45.0%; H, 1.1%; S, 17.8%; Cl, 29.3%.

Example 5

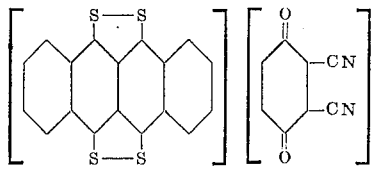

In preparing the above salt, .70 gram of tetrathiotetracene dissolved in 300 ml. of warm trichlorobenzene was mixed with .35 gram of dicyano-p-benzoquinone in 50 ml. of trichlorobenzene.

After standing overnight, the precipitate was filtered, washed with benzene and then washed with ether.

The reaction product was analyzed.

The results of this analysis are as follows:

Theory $(C_{18}H_8S_4)C_8H_2N_2O_2$: C, 61.3%; H, 1.6%; N, 5.5%. Found: C, 60.0%; H, 2.3%; N, 5.8%.

Example 6

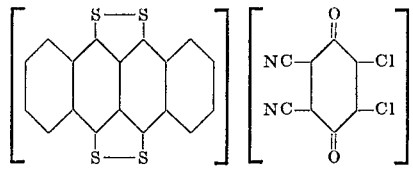

In preparing the above salt, 1.00 gram of tetrathiotetracene dissolved in 400 ml. of warm trichlorobenzene was mixed with .88 gram of dichlorodicyano-p-benzoquinone dissolved in 70 ml. of trichlorobenzene.

The resulting dark red precipitate was filtered, washed with benzene and then washed with ether.

The reaction product was analyzed.

The results of this analysis are as follows:

Theory $C_{18}H_8S_4 \cdot C_8Cl_2N_2O_2$: C, 53.8%; H, 1.4%; Cl, 12.2%; N, 4.8%. Found: C, 53.7%; H, 1.6%; Cl, 13.8%; N, 4.9%.

Example 7

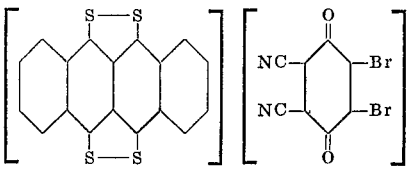

In preparing the above salt, .70 gram of tetrathiotetracene dissolved in 300 ml. of hot trichlorobenzene was mixed with .63 gram of dibromodicyano-p-benzoquinone dissolved in 50 ml. of the same solvent.

After standing overnight, the precipitate was filtered, washed with benzene and then washed with ether.

The reaction product was analyzed.

The results of this analysis are as follows:

Theory $C_{18}H_8S_4 \cdot C_8Br_2N_2O_2$: C, 46.7%; H, 1.5%; N, 4.2%. Found: C, 45.5%; H, 1.4%; N, 3.7%.

The electrical resistivity measurements were carried out on pressed pellets of the various salts identified above by a potential probe method.

The temperature-dependence was examined in the range of 0° C. to 120° C. and it was found that the resistivities obeyed the usual exponential law $$\rho = \rho_0 \exp\ (Eg/2kT)$$

which has been observed in most other organic materials, where $\rho$ = the resistivity, $\rho_0$ equals a constant, $Eg$ equals the energy gap, $k$ equals the Boltzmann constant and $T$ equals the temperature in ° K.

From the sign of the thermoelectric power, conduction was found to be of the p-type for all of the salts.

The thermoelectric power is determined at room temperature by pressing a cold probe and a hot probe on the sample in the form of pressed pellets, measuring the resulting voltage and then calibrating against a substance of known thermoelectric power, in this case $SnSe_2$.

The electrical properties for the compounds of this invention are set forth in the table below.

ELECTRICAL PROPERTIES

| Ex. No. | Salt | $\rho(20°\,C.)$ (ohm-cm.) | Eg (ev.) | Thermoelectric Power ($\mu v./deg.$) |
|---|---|---|---|---|
| 1 | $(C_{18}H_8S_4)_3 \cdot C_6Cl_4O_2$ | 2~4 | 0.20 | 20 |
| 2 | $(C_{18}H_8S_4)_3 \cdot C_6Br_4O_2$ | 6~8 | 0.20 | 30 |
| 3 | $(C_{18}H_8S_4)_3(C_6N_4)_2$ | 15 | 0.20 | 30 |
| 4 | $(C_{18}H_8S_4)_2(C_6Cl_4O_2)_3$ | 2,300 | | |
| 5 | $(C_{18}H_8S_4) \cdot C_8H_2H_2O_2$ | 250 | .38 | |
| 6 | $C_{18}H_8S_4 \cdot C_8C_{.2}N_2O_2$ | 70 | .34 | |
| 7 | $C_{18}H_8S_4 \cdot C_8Br_2N_2O_2$ | 170 | .34 | |

It will be seen that the salts of Examples 1–3 demonstrate superior electrical properties with respect to those of Examples 4–7. In addition, those salts of Examples 4–7 were found to be less stable than those of Examples 1–3.

The electrical properties of these tetrathiotetracene ion-radical salts may be affected by departure from exact stoichiometric conditions. Thus, high purity raw materials should be employed in their preparation. Influencing of the electrical properties may be achieved deliberately by the inclusion of various impurities or dopes.

What is claimed:
1. A complex of the formula:

$$[D]_m[A]_n$$

where D is a tetrathiotetracene of the formula

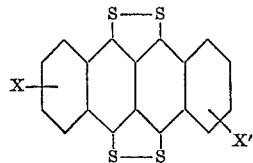

where X and X' are selected from the group consisting of H and lower alkyl, m and n are positive integers of less than 4, and where A is selected from the group consisting of o- and p-benzoquinones having at least 2 electronegative substituents and tetracyanoethylene.

2. A complex of the formula:

$$[D]_3[A]_n$$

where D is tetrathiotetracene and A is selected from the group consisting of o-chloranil, o-bromoanil, o-iodoanil and tetracyanoethylene, and n is 1, except when A is tetracyanoethylene, when n is 2.

3. A complex according to claim 2 in which A is o-chloranil.

4. A complex according to claim 2 in which A is o-bromoanil.

5. A complex according to claim 2 in which A is o-iodoanil.

6. A complex according to claim 2 in which A is tetracyanoethylene.

7. A complex of the formula $$[D]_m[A]_n$$

where D is tetrathiotetracene of the formula

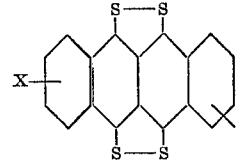

where X and X' are selected from the group consisting of H and lower alkyl, m and n are positive integers of less than 4, and where A is selected from the group consisting of tetracyanoethylene and o- and p-benzoquinones having at least 2 electronegative substituents selected from the group consisting of halogen, cyano, nitro and carboxy.

References Cited

Ioffe: J. Gen. Chem., USSR, vol. 21 (1951), pp. 1843–9.

JAMES A. PATTEN, *Primary Examiner.*